(12) United States Patent
Grudin et al.

(10) Patent No.: US 11,112,288 B2
(45) Date of Patent: Sep. 7, 2021

(54) THERMAL GAS PROPERTY SENSOR

(71) Applicant: First Sensor AG, Berlin (DE)

(72) Inventors: Oleg Grudin, Montreal (CA); Andreas Niendorf, Berlin (DE)

(73) Assignee: First Sensor AG, Berlin (DE)

( * ) Notice: Subject to any disclaimer, the term of this patent is extended or adjusted under 35 U.S.C. 154(b) by 6 days.

(21) Appl. No.: 16/489,568

(22) PCT Filed: Mar. 1, 2018

(86) PCT No.: PCT/EP2018/055072
§ 371 (c)(1),
(2) Date: Aug. 28, 2019

(87) PCT Pub. No.: WO2018/158382
PCT Pub. Date: Sep. 7, 2018

(65) Prior Publication Data
US 2020/0011716 A1   Jan. 9, 2020

Related U.S. Application Data

(60) Provisional application No. 62/466,485, filed on Mar. 3, 2017.

(30) Foreign Application Priority Data

Sep. 13, 2017   (EP) .................................... 17190916

(51) Int. Cl.
*G01F 1/688* (2006.01)
*G01F 1/696* (2006.01)
*G01F 15/02* (2006.01)
*G01N 25/18* (2006.01)

(52) U.S. Cl.
CPC ............ *G01F 1/6888* (2013.01); *G01F 1/696* (2013.01); *G01F 15/02* (2013.01); *G01N 25/18* (2013.01)

(58) Field of Classification Search
CPC ........ G01F 1/6888; G01F 1/696; G01F 15/02; G01F 1/6845; G01F 1/68; G01N 25/18; G01N 27/18; G01N 9/00
See application file for complete search history.

(56) References Cited

U.S. PATENT DOCUMENTS 6,301,960 B1 * 10/2001 Yamakawa ............. G01F 1/692
 73/204.26
6,345,536 B1   2/2002 Morrison et al.
(Continued)

FOREIGN PATENT DOCUMENTS

DE   3821690 A1   7/1989
EP   2745775 A1   6/2014
(Continued)

OTHER PUBLICATIONS

"Chinese Application Serial No. 201880015700.4, Office Action dated Aug. 7, 2020", w/ English Translation, (dated Aug. 7, 2020), 13 pgs.
(Continued)

*Primary Examiner* — Benjamin R Schmitt
(74) *Attorney, Agent, or Firm* — Schwegman Lundberg & Woessner, P. A.

(57) ABSTRACT

The present disclosure provides thermal gas property sensors and compensated differential pressure sensors, as well as methods for measuring a physical property of a gas and methods for compensating differential pressure sensors. A reference overpressure of a gas is generated in a cavity. Based on the flow of the gas from the cavity through a channel, properties of the gas are identified.

19 Claims, 11 Drawing Sheets

(56) References Cited

U.S. PATENT DOCUMENTS

| | | | |
|---|---|---|---|
| 8,677,818 B2 | 3/2014 | Landsberger et al. | |
| 2008/0264181 A1 | 10/2008 | Sulouff et al. | |
| 2009/0227006 A1 | 9/2009 | Kopp et al. | |
| 2010/0239436 A1* | 9/2010 | Bonne .................. | G01N 27/02 417/207 |

FOREIGN PATENT DOCUMENTS

| | | |
|---|---|---|
| WO | WO-2008053729 A1 | 5/2008 |
| WO | WO-2014106696 A1 | 7/2014 |
| WO | WO-2016053589 A1 | 4/2016 |

OTHER PUBLICATIONS

"European Application Serial No. 17190916.1, Extended European Search Report dated May 29, 2018", (dated May 29, 2018), 10 pgs.
"International Application Serial No. PCT/EP2018/055072, International Search Report dated Jul. 19, 2018", (dated Jul. 19, 2018), 5 pgs.
"International Application Serial No. PCT/EP2018/055072, Written Opinion Report dated Jul. 19, 2018", (dated Jul. 19, 2018), 8 pgs.
"Chinese Application Serial No. 201880015700.4, Office Action dated Feb. 4, 2021", w/ English Translation, (dated Feb. 4, 2021), 13 pgs.
"European Application Serial No. 18706770.7, Extended European Search Report dated Feb. 3, 2021", (dated Feb. 3, 2021), 5 pgs.

\* cited by examiner

THERMAL GAS PROPERTY SENSOR

PRIORITY APPLICATIONS

This application is a U.S. National Stage Filing under 35 U.S.C. 371 from International Application No. PCT/EP2018/055072, filed on Mar. 1, 2018, and published as WO2018/158382 on Sep. 7, 2018, which claims the benefit of priority to European Application No. 17190916.1, filed on Sep. 13, 2017 and to U.S. Application No. 62/466,485, filed on Mar. 3, 2017; the benefit of priority of each of which is hereby claimed herein, and which applications and publication are hereby incorporated herein by reference in their entirety.

TECHNICAL FIELD

The present disclosure relates to gas sensors, and more specifically to semiconductor-based thermal gas property sensors.

BACKGROUND OF THE ART

Gas measuring devices can be used to determine various properties of gases and such parameters of gas media as velocity, flow or pressure. For example, thermal sensing elements can be located in micro channels formed in a semiconductor die or sensor package. The thermal sensors can be sensitive to gas flow in the channels due to temperature gradients in the sensing area induced by flow of the gas. Such sensors can also be used to measure differential pressure causing gas flow through micro channels.

Calorimetric-type thermal flow sensors, used to measure differential pressure, require temperature and barometric pressure compensation. Typically they operate in air, though operation at different gases is also possible by introducing gas correction factors. Certain limitations occur if gas composition varies uncontrollably during operation. For these applications, sensitivity of the pressure response to varying gas properties is often considered to be a negative feature.

SUMMARY

The present disclosure provides thermal gas property sensors and compensated differential pressure sensors, as well as methods for measuring a physical property of a gas and methods for compensating differential pressure sensors. A reference overpressure of a gas is generated and/or may be determined in a cavity pneumatically connected to the thermal flow sensor with a flow channel. Based on the flow of the gas from the cavity through a channel, properties of the gas are identified.

In accordance with a broad aspect, there is provided a gas property sensor comprising a measuring device having defined therein a cavity having at least one opening and at least one channel in fluid communication with the cavity via an opening and with a first gas volume, which may for example be another cavity or an outside environment. The gas property sensor may further comprise a pressure difference sensor or a pressure generator disposed in or near the cavity and one or more flow-sensitive elements located in the channel for determining a gas flow parameter. This gas flow parameter may be for example a parameter characterizing the dynamic properties of the gasflow; for example: gasflow velocity, gas flow density, mass flow etc. The measuring device may be, for example, a semiconductor device. The pressure generator may be located in the cavity, adjacent to the cavity or near the cavity, as long as it can serve to generate a pressure in the cavity.

According to another broad aspect, there is provided a method for measuring a physical property of a gas. The gas is received in a cavity of a measuring device, which in one potential implementation may be a semiconductor device, the cavity having an opening. A reference overpressure of the gas is measured or determined, or it is generated in the cavity by actuating a pressure generator disposed in the cavity. A gas flow parameter is measured based on movement of the gas through a channel in fluid communication with the cavity via the opening and with a first gas volume or an outside environment, and the physical property of the gas is determined based on the gas flow parameter, potentially an ambient temperature, and an ambient pressure or a temperature and/or pressure in the first gas volume.

According to yet another broad aspect, there is provided a compensated differential gas pressure sensor. The sensor comprises a gas property sensor comprising a measuring device having defined therein a cavity having an opening and a channel in fluid communication with the cavity via the opening and with a first gas volume or an outside environment. The gas property sensor further comprises a pressure generator disposed in the cavity and one or more flow-sensitive elements located in the channel for determining a gas flow parameter. The sensor further comprises a differential pressure sensor pneumatically coupled to a same gas media as the gas property sensor and configured for acquiring an uncompensated differential pressure measurement, and a processing unit configured for providing a compensated differential pressure based on the at least one of physical properties of the gas and a first gas volume pressure or an ambient pressure and the uncompensated differential pressure.

According to another aspect, there is provided a method for compensating a differential gas pressure measurement. The method comprises acquiring an uncompensated differential pressure measurement with a differential pressure sensor, receiving a gas in a cavity defined in a measuring device, for example a semiconductor chip located on a first surface of a substrate, the cavity having an opening, measuring or generating a reference overpressure of the gas in the cavity by actuating a pressure generator disposed in the cavity, measuring a gas flow parameter based on movement of the gas through a channel in fluid communication with the cavity via the opening and with a second gas volume or an outside environment, determining physical properties of the gas and an ambient pressure based on the gas flow parameter and the reference overpressure, and determining a compensated differential pressure based on the physical properties of the gas, an ambient pressure, and the uncompensated differential pressure.

The methods and apparatuses mentioned above may not only be used for measuring pressure differences and/or properties of gases, but more generally for fluids, including liquids. In that case the word "gas" may be replaced by "fluid" or "liquid". An overpressure generator may in that case be implemented as a volume expansion element in the cavity or the chamber or as a heating element that heats a quantity of a fluid in order to transform it to a steam or gas, and in that way expands a gas volume. Features of methods and apparatuses that may be used for liquids are further elaborated in the aspects of the invention at the end of this description.

Features of the systems, devices, and methods described herein may be used in various combinations, and may also be used for the system and computer-readable storage medium in various combinations.

As implementations of the above-mentioned aspects, the following may further be provided:

It may further be provided that the measuring device comprises: a substrate having first and second surfaces; a first semiconductor chip portion mounted on the first surface of the substrate; and a second semiconductor chip portion mounted on the first semiconductor chip portion, the channel being defined within at least one of the first and the second semiconductor chip portion and the cavity being defined within at least one of the first and the second semiconductor chip portion.

The cavity may be formed by a recess in both the first and the second semiconductor chip portion, wherein the recess in the second semiconductor chip portion may be formed as a through-hole that is covered by a lid or a cap. In this way, different etching processes may be used for the second semiconductor chip portion for forming a cavity that is deeper than the channel.

It may further be provided that at least a part of the cavity is further defined within the substrate.

It may further be provided that the pressure generator is a, or comprises at least one, heating element.

It may further be provided that the heating element is mounted on the first surface of the substrate or is at least partially embedded within the first surface of the substrate. The heating element may also be embedded within the first semiconductor chip.

It may further be provided that the sensor further comprises a processing unit, wherein the processing unit is configured to determine at least one physical property of the first gas based on gas flow parameter or thermal flow parameter and/or the gas pressure difference, or wherein the processing unit is configured to identify a chemical composition of the gas.

It may further be provided that determining a gas flow parameter comprises: measuring a first gas flow rate following an increase of reference gas pressure inside the cavity; measuring a second gas flow rate following a decrease of reference gas pressure inside the cavity; and determining the gas flow parameter based on a difference between the first and second gas flow rates and/or estimating gas properties by analyzing the curvature of the signal of said flow sensor. By a reference gas pressure in this context, a reference pressure of the first gas shall be understood. Such a reference pressure or reference pressure value may be fixed in advance and may be established by a determined action of a pressure generator, e.g. a heating element.

It may further be provided that the one or more flow-sensitive elements comprise at least a first temperature sensor located at a first position in the channel and a second temperature sensor located at a second position in the channel different from the first position.

It may further be provided that the one or more flow-sensitive elements comprise at least one heating element that is configured to heat a heat exchange element with a predetermined energy rate and a temperature sensor sensing a temperature of the heat exchange element, wherein the heat exchange element is exposed to the gas flow in the channel.

It may further be provided that the compensated differential gas pressure sensor comprises a sensor for measuring a gas temperature and/or a sensor for measuring a gas pressure, wherein one or both of the said sensors is/are located in the cavity or outside the cavity (it may be more practical to put additional absolute pressure and temperature sensors outside of the cavity but in the same package with the main gas property sensor chip).

The following may also be further provided:

It may further be provided that the differential gas pressure sensor configured for measuring an uncompensated differential gas pressure comprises a thermal gas flow sensor that is located in a measuring channel that is pneumatically coupled to the first chamber as well as with the first gas volume or a second gas volume.

It may further be provided that the processing unit is configured to determine a quantity of gas that has flowed through a channel in a predetermined time interval and to determine an equivalent of the gas quantity, particularly a price.

There may further be provided a system with a gas tube connecting a gas reservoir with at least one gas consuming device, wherein the system comprises at least one compensated differential pressure sensor according to the above aspects, and wherein the system provides an indication of the quantity of gas that has been consumed in a time interval on the basis of a measured compensated pressure difference.

The following may also be further provided:

It may further be provided that the gas property is determined on the basis of a ratio of the gas flow parameter representing a quantity of a gas flow and the overpressure.

It may further be provided that a reference gas overpressure is generated by heating the gas in the cavity.

It may further be provided that the gas flow is measured after the establishment of stationary thermal conditions in the cavity including a stable temperature gradient in the cavity.

It may further be provided that additionally one or more of the following parameters is measured: ambient temperature, absolute pressure of the gas in the cavity and/or absolute gas pressure in the first gas volume, gas viscosity of the gas, thermal conductivity of the gas, thermal capacity of the gas.

There may further be provided a method for measuring a compensated differential gas pressure between a first chamber and a first or second gas volume or an ambient environment, comprising: a method for measuring a physical property of a gas according to one of the above aspects and measuring an uncompensated gas pressure difference between a first chamber that is filled with the same gas as the gas property sensor cavity and the first or second gas volume or the ambient environment, and determining a compensated pressure difference value on the basis of the measured physical properties of the gas and the result of the uncompensated pressure difference measurement.

This method may make use of the gas property sensor of claim 1 and/or a gas property sensor with one or more of the features explained above. The first chamber may be connecteds or connectable to the cavity of the gas property sensor by a gas channel. The gas channel may be closable by a valve.

In connection with a gas property sensor or a differential pressure sensor, it may further be provided that:

at least one channel with two openings is formed and that at least one flow sensing element is provided in order to measure flow and gas properties simultaneously, wherein the flow sensing element may be integrated in a semiconductor chip or on a substrate or assembled separately;

the channel connecting the cavity with a gas volume or the environment is connected to the same opening as the gas flow channel;

the openings are located on one side of the substrate;

a combination of at least two sensors as described above is provided, wherein one sensor is configured to measure the environmental pressure by comparing it with a known reference gas and one sensor is configured to measure gas properties.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

The flow sensing element of a calorimetric-type thermal flow sensor usually contains two temperature-sensitive elements and an electrical heater located between them. Flow of the gas through the channel varies a temperature differential between upstream and downstream elements. The temperature differential is converted into an electrical signal which can be processed by a processing unit.

The value of the temperature differential depends not only on flow or differential pressure but also on gas density, thermal conductivity, specific heat and viscosity. Gas density in turn depends on ambient pressure and temperature that determines net pressure response of the sensor U as:

$$U = A(\text{gas\_properties}, P_0, T_0) \times P \quad (1)$$

where $A(\text{gas\_properties}, P_0, T_0)$ is complex function based on physical properties of the gas, an ambient pressure $P_0$ and an ambient temperature $T_0$, and where P is an applied differential pressure.

These relationships can be used in a variety of ways to determine various properties of gases. In particular, the sensitivity to varying gas properties of calorimetric-type thermal flow sensors can be used to determine physical properties of a gas. By creating a reference overpressure of a gas in a cavity and then measuring the flow of the gas through a channel connected to said cavity, one or more properties of the gas can be identified.

Some non-limiting applications include gas composition identification and absolute pressure measurement. For example, specific parameters, such as thermal conductivity, can affect heat dissipation in the vicinity of the heating element. Based on measurement of the dissipated power and overheating temperature of the heating element combined with the reading of the flow-sensitive elements, gas composition identification and/or absolute pressure measurement can be performed. In another example, a calorimetric-type differential pressure sensor insensitive to barometric pressure and gas composition can be built, based on compensation of a pressure response using the thermal gas property sensor. In some cases, usage of thermal conductivity as the only parameter characterizing gas may be insufficient, for example if gas mixtures containing more than two components are investigated or gases with close thermal conductivities must be identified. In this case, usage of additional gas-specific parameters like density or speed of sound may be beneficial.

Figure 1:
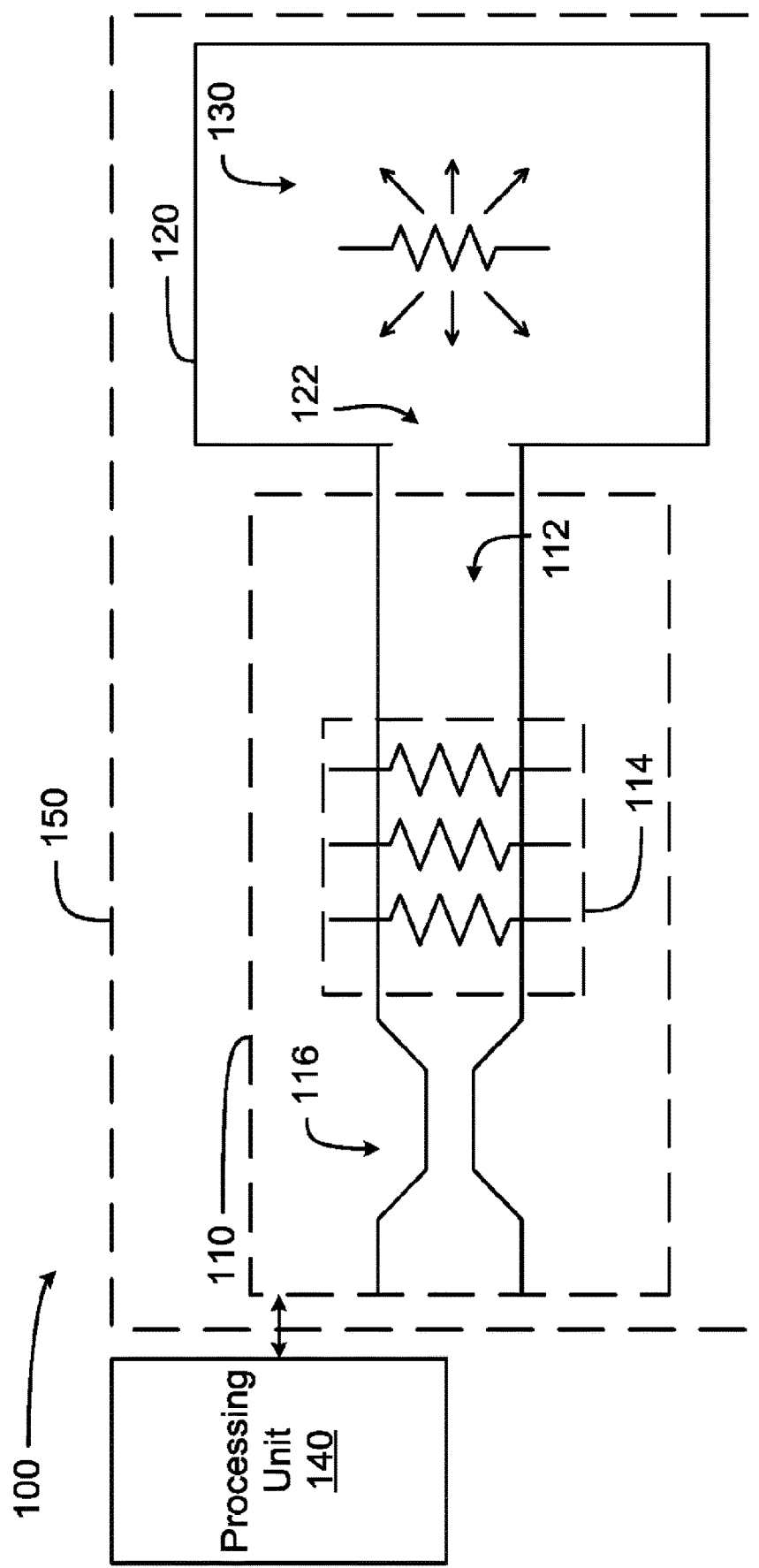
FIG. 1 is a schematic diagram of a gas property sensor according to an embodiment.

With reference to FIG. 1, a thermal gas property sensor 100 can be implemented as part of a semiconductor device 150 which includes a thermal flow sensing module 110 and a cavity 120. The semiconductor device 150, described in greater detail hereinbelow, can be a semiconductor chip, the semiconductor chip on a substrate or other base, the semiconductor chip with an encapsulating element, a plurality of semiconductor chips, or any suitable combination of the above-mentioned elements.

The flow sensor module 110 defines a flow channel 112 in the semiconductor device 150 in which are disposed one or more flow-sensitive elements 114. The flow channel 112 has a first end in fluid communication with the opening 122 of the cavity 120, and a second, opposite end in fluid communication with an ambient or outside environment or a first gas volume not shown in FIG. 1. In certain embodiments, a portion of the flow channel 112 may have a restrictive element 116, which can be used to provide a predetermined pneumatic resistance. In certain embodiments, the restrictive element 116 can be a portion of the flow channel 112 which is more narrow than the rest of the flow channel 112, for example having a specially determined cross section and length to provide the predetermined pneumatic resistance. In other embodiments, the restrictive element 116 can be a separate object inserted in the flow channel 112. The flow-sensitive elements 114 may be implemented as thermopiles, thermoresistors, or using other suitable devices.

The cavity 120 defines a partially enclosed space in the semiconductor device 150 which is open to the flow channel 112 via an opening 122. The cavity 120 can enclose any suitable volume configured for generating a predetermined overpressure therein to cause gas to flow through the flow sensing module 110, and more specifically through the flow channel 112. In certain embodiments, the flow channel 112 and/or the cavity 120 are defined in the semiconductor device 150 by one or more etching processes. However, they can as well be defined in a cast or pressure cast body of, for example, a plastic, thermoplastic, resin or metal material.

A pressure generator 130 is disposed in the cavity 120 to alter the pressure in the cavity 120. In some embodiments, the pressure generator 130 is a heating element which provides heat to the gas contained in the cavity 120, thus altering the pressure of the gas in the cavity 120. For example, the pressure generator 130 can be a resistor or other heat-producing electrical component. In other embodiments, the pressure generator 130 is an electro-mechanical actuator which can be used to generate a predetermined overpressure in cavity 120. For example, the electro-mechanical actuator can change inner volume of the cavity 120 by expanding within the cavity 120, thereby creating the predetermined overpressure. The pressure generator 130 can thus be actuated to produce the reference overpressure in the cavity 120 by heating and/or compressing the gas contained therein. The pressure generator 130 can be controlled by a processing unit 250 and may be operated in a pulsed fashion, wherein the pressure generator 130 is alternatingly turned on for periods of time and turned off for other periods of time. In some embodiments, the actuation of the pressure generator 130 follows a substantially sinusoidal curve. Still other modes of operation for the pressure generator 130 are considered.

By producing a reference overpressure in the cavity 120 and then measuring the flow of the gas in the cavity 120 along the flow channel 112, the thermal gas property sensor 100 can produce an output representative of a gas flow parameter. The gas flow parameter can itself be used, for example by a processing unit 140 to determine one or more properties of the gas in the cavity 120. For example, the gas flow parameter can be representative of physical properties of the gas in the cavity 120, such as a combination of a density, a thermal conductivity, and viscosity of the gas, and the like. In some embodiments, the physical property of the gas can be determined based on a plurality of measurements of gas flow rates. For example, a first gas flow rate when the pressure in cavity 120 is increasing, and a second gas flow rate when the pressure in cavity 120 is decreasing.

Figure 2A:
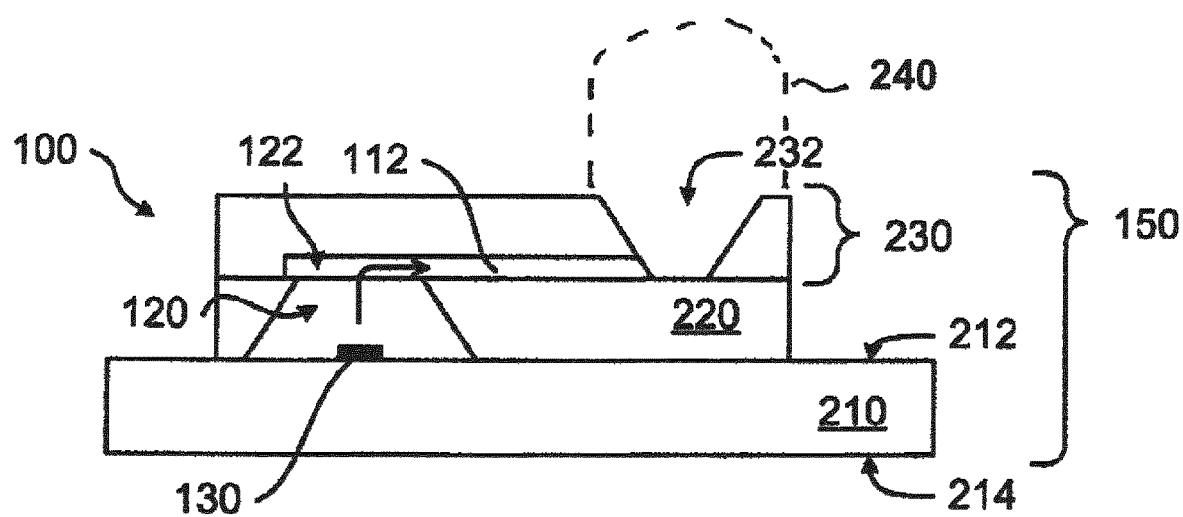
FIGS. 2A-C are side-views of different embodiments of the gas property sensor of FIG. 1.
Figure 2B:
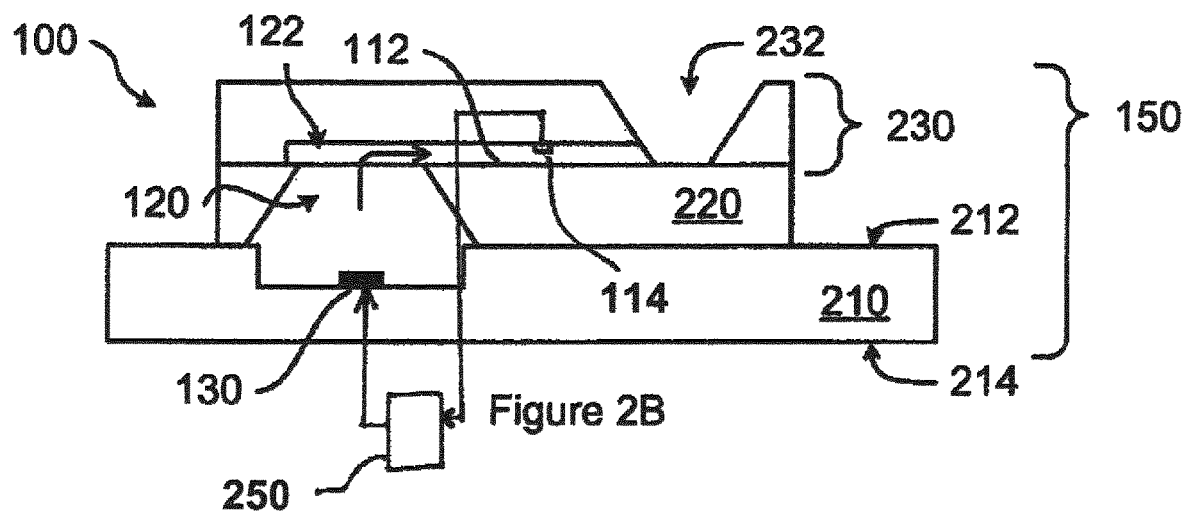
Figure 2C:
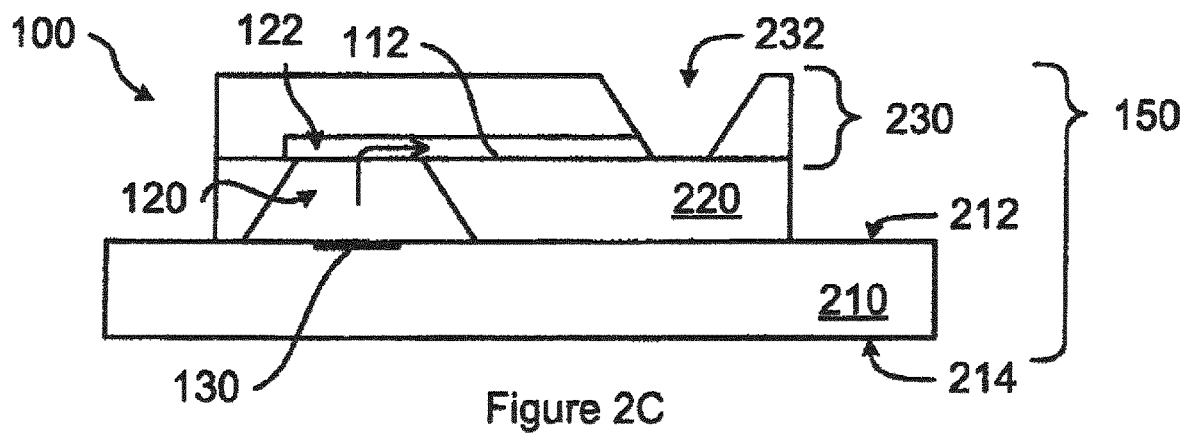

With reference to FIGS. 2A-C, as described hereinabove, the thermal gas property sensor 100 can be implemented using integrated circuit technology as part of a semiconductor device 150. In some embodiments, the semiconductor device 150 includes a semiconductor chip and a capping element which can be located or mounted on a substrate. The cavity 120 is a volume defined in the semiconductor chip and bounded by the substrate and/or a portion of the semiconductor chip, and the flow channel 112 is formed by an opening or space between the semiconductor chip and the capping element, placed over the semiconductor chip. In still other embodiments, the semiconductor device 150 includes a first semiconductor chip in which the cavity 120 is defined, and the flow channel 112 is defined within a second semiconductor chip placed overtop the first semiconductor chip. In some embodiments, the flow channel is formed via an etching process, for example.

In FIG. 2A, a first embodiment the thermal gas property sensor 100 is implemented in an embodiment of the semiconductor device 150 which has a substrate 210 having first and second surfaces 212, 214. A first semiconductor chip portion 220 is located on the first surface 212 of the substrate 210, and a second semiconductor chip portion 230 is mounted thereon. The first semiconductor chip portion 220 has formed therein the cavity 120. In certain embodiments, the flow-sensitive elements 114 are also disposed within the first semiconductor chip portion 220, inside the flow channel 112 (not illustrated). The second semiconductor chip portion 230 has etched therein a groove or other channel like element. When the first and second semiconductor chip portions 220, 230 are aligned and bonded together, the groove forms the flow channel 112, and the flow-sensitive elements 114 located in the first semiconductor chip portion 220 are positioned inside this channel. Additionally, the second semiconductor chip component 230 contains opening 232, which places the flow channel 112 in fluid communication with the outside environment. The embodiments illustrated in U.S. Pat. No. 8,677,818, which is incorporated herein by reference, may be used to implement the thermal gas property sensor 100 as described herein.

The pressure generator 130 is mounted within the cavity 120 on the surface 212, and actuation of the pressure generator 130 causes a change in gas pressure in the cavity 120. This change in gas pressure in turn results in gas flow through the cavity opening 122, the flow channel 112, and the opening 232, which can be measured by the flow-sensitive elements 114 to determine a gas flow property. The flow-sensitive elements and the gas pressure generator 130 are electrically connected to a processing unit 250.

In FIG. 2B, a second embodiment of the thermal gas property sensor 100 is illustrated. In the second embodiment, the cavity 120 is defined within both the first semiconductor chip portion 220 and the substrate 210, and the pressure generator 130 is mounted on the substrate 210 in a pocket formed in the substrate 210 within the cavity 120. In FIG. 2C, a third embodiment of the thermal gas property sensor 100 is illustrated. In the third embodiment, the pressure generator 130 is embedded in the first surface 212 of the substrate 210 and aligned with the cavity 120. Still further embodiments of the thermal gas property sensor 100 are considered.

In each of the embodiments of FIGS. 2A-C, the cavity 120, the flow channel 112, and the opening 232, which connects the channel 112 with a first gas volume 240, which may be formed by a closed chamber or may be the ambient environment, can be manufactured by wet or dry etching of the semiconductor device 150. Additionally, the flow-sensitive elements 114, although not illustrated, can be disposed in the flow channel 112 in any suitable fashion. For example, the flow-sensitive elements 114 can include a first temperature sensor located at a first point in the flow channel 112 and a second temperature sensor located at a second point in the flow channel 112 different from the first point.

Additionally, in certain embodiments the gas property sensor 100 is implemented via a semiconductor chip located on the substrate 210 and by a capping element disposed thereon. In such embodiments, the semiconductor chip is similar to the first semiconductor chip portion 220, and the capping element placed over the semiconductor chip defines a gap therebetween which forms the flow channel 112. Moreover, although not illustrated in FIGS. 2A-C, in certain embodiments the flow channel 112 may have a restrictive element 116, as described hereinabove. The pressure generator 130 can be a surface-mount resistor, as in the embodiments of FIG. 2A and FIG. 2B, a printed resistor, as in the embodiment of FIG. 2C, or any other suitable heat-producing element.

Figure 3:
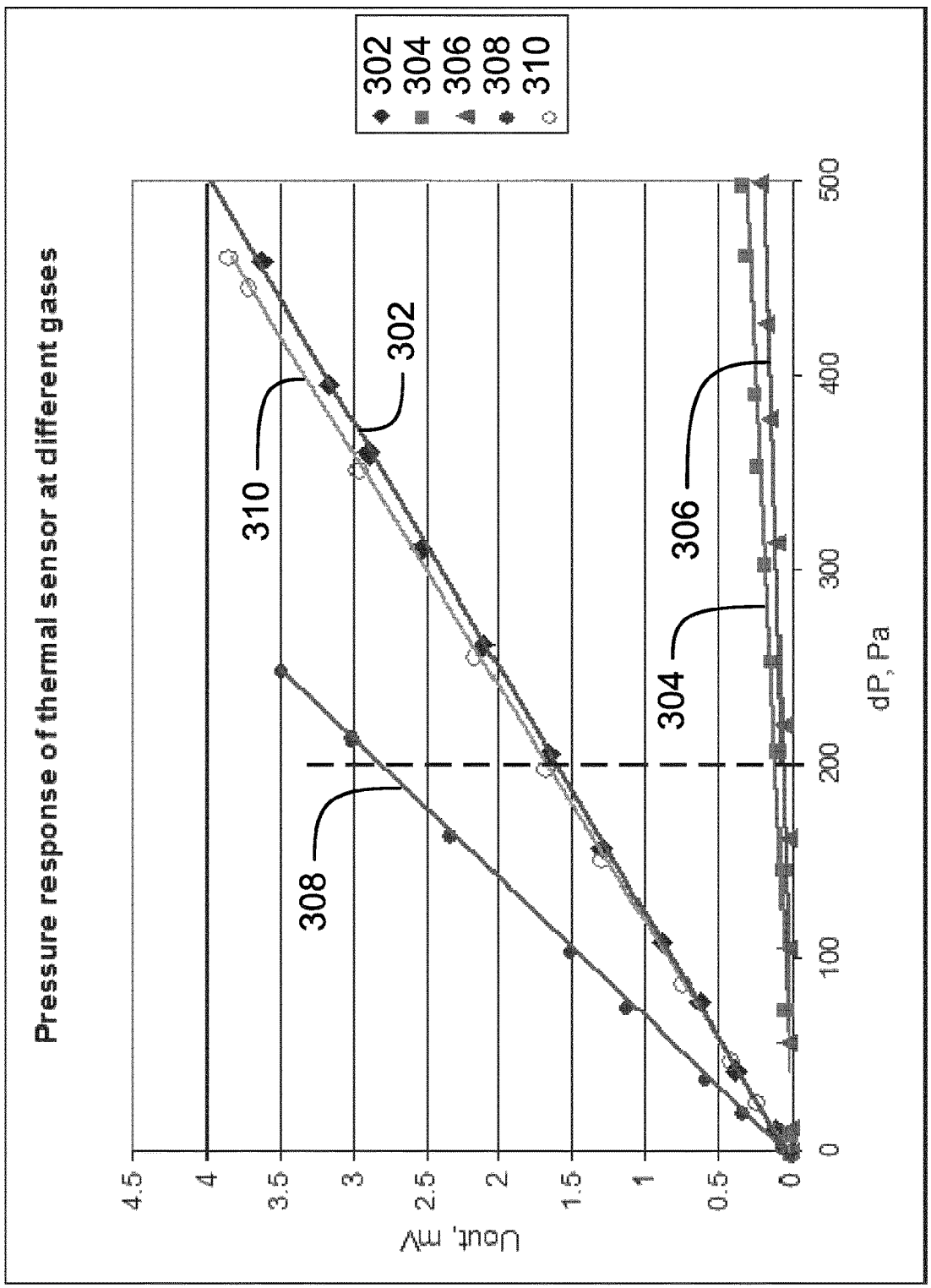
FIG. 3 illustrates example pressure responses of the gas property sensor of FIG. 1 to different gases.

With reference to FIG. 3, experimentally-measured differential pressure responses of a LBA™ series thermal flow sensor (manufactured by First Sensors Corp.) are shown. Measurements are done at an ambient atmospheric pressure of 1 bar for a plurality of different gases. If a known reference differential pressure is applied to the LBA™ series thermal flow sensor, for example 200 Pa, the output from the LBA™ series thermal flow sensor can be an indicator of gas composition.

In equation (1), a complex function was introduced which depends on the gas properties of the gas in the cavity 120. Equation (1) can also be represented via the following formula:

$$A(\text{gas\_properties}, P_0, T_0) = \frac{U_r}{P_r} \qquad (2)$$

where $U_r$ is the output of the thermal gas property sensor 100 when the predetermined overpressure $P_r$ is reached. When the gas in the cavity 120 is dry air, the experimentally measured pressure response of the sensor 100 is shown as line 302. The output of the LBA™ series thermal flow sensor in response to differential pressures provides different outputs depending on the gas type, such that line 304 represents a pressure response for hydrogen ($H_2$), line 306—for helium (He), line 308—for carbon dioxide ($CO_2$), and line 310—for nitrogen ($N_2$).

As discussed hereinabove, in some embodiments the reference overpressure in the cavity 120 can be generated by way of a resistor or other heating element acting as the pressure generator 130. For example, the pressure generator 130 can be operated in a pulsed mode, and pulse heating of the heating resistor can be described by the equation:

$$Wdt = CdT_{oh} + \eta T_{oh} dt \quad (3)$$

where W is power dissipated on the resistor 130, C is a heat capacity of the resistor 130 (measured in Joules per Kelvin), $\eta$ is representative of thermal losses of the resistor 130 (measured in Watts per Kelvin), $T_{oh}$ is an overheating temperature of the resistor 130, $dT_{oh}$ is a temperature infinitesimal differential, and dt is a time infinitesimal differential.

Equation (3) can be solved for a time-varying temperature of the heating element as:

$$T_{oh}(t) = T_h(1 - \exp(-t/\tau_h)) \quad (4)$$

where $$T_h = \frac{W}{\eta}$$

and $\tau_h$ is a heating constant, such that $$\tau_h = \frac{c}{\eta}.$$

The cavity 120 can be defined so as to have a predetermined volume $V_0$, and prior to any heating provided by the heating resistor 130, the gas in the cavity 120 can be at an ambient pressure $P_0$. Thus, the pressure $P_{enc}$ in the cavity 120 can be defined as:

$$P_{enc} = P_0 + P_r \quad (5)$$

where the reference overpressure $P_r$ is much less than the ambient pressure $P_0$. Based on this, the overpressure in the cavity 120 can be found from the universal gas law for the enclosed gas with varying temperature and leakage from the cavity 120 as:

$$\frac{dP_r}{dt} V_0 = -\frac{\rho f}{\mu} RT_g + \frac{m}{\mu} R \frac{dT_g}{dt} \quad (6)$$

where m is a mass of gas in the cavity 120, f is a gas flow leak from the cavity 120, $\rho$ is a density of the gas in the cavity 120, $\mu$ is a molecular mass of the gas in the cavity 120, R is the universal gas constant, and $T_g$ is a temperature of the gas in the cavity 120.

It is assumed that any deviation of temperature in the cavity 120 from an ambient temperature $T_0$ can be determined based on the overheating temperature $T_{oh}$ of the heating resistor 130 such that:

$$T_g = T_0 + aT_{oh} \quad (7)$$

Coefficient a is used to take into account the fact that gas in the cavity 120 is not heated uniformly. The value $aT_{oh}$ (where a<1) is equivalent to an averaged overheating temperature of the gas in the volume $V_0$ of the cavity 120.

The flow leak from the cavity 120 depends on a pneumatic impedance $R_{pn}$ of the flow channel 112 and can be expressed by:

$$f = \frac{P_r}{R_{pn}} \quad (8)$$

With these assumptions, Equation (6) can be expressed as:

$$\frac{dP_r}{dt} + \frac{1}{\tau_{pn}} P_r = \frac{P_0}{T_0} \frac{dT}{dt} \quad (9)$$

where $$\tau_{pn} = \frac{R_{pn} V_0}{P_0}$$

Solving equations (4) and (9) provides:

$$P_r(t) = \frac{P_0 a T_h}{\tau_h T_0} \frac{\tau_h \tau_{pn}}{\tau_h - \tau_{pn}} \left[ \exp\left(-\frac{t}{\tau_h}\right) - \exp\left(-\frac{t}{\tau_{pn}}\right) \right] = \quad (10)$$

$$= \frac{V_0 R_{pn} a T_h}{T_0 (\tau_h - \tau_{pn})} \left[ \exp\left(-\frac{t}{\tau_h}\right) - \exp\left(-\frac{t}{\tau_{pn}}\right) \right]$$

Figure 4A:
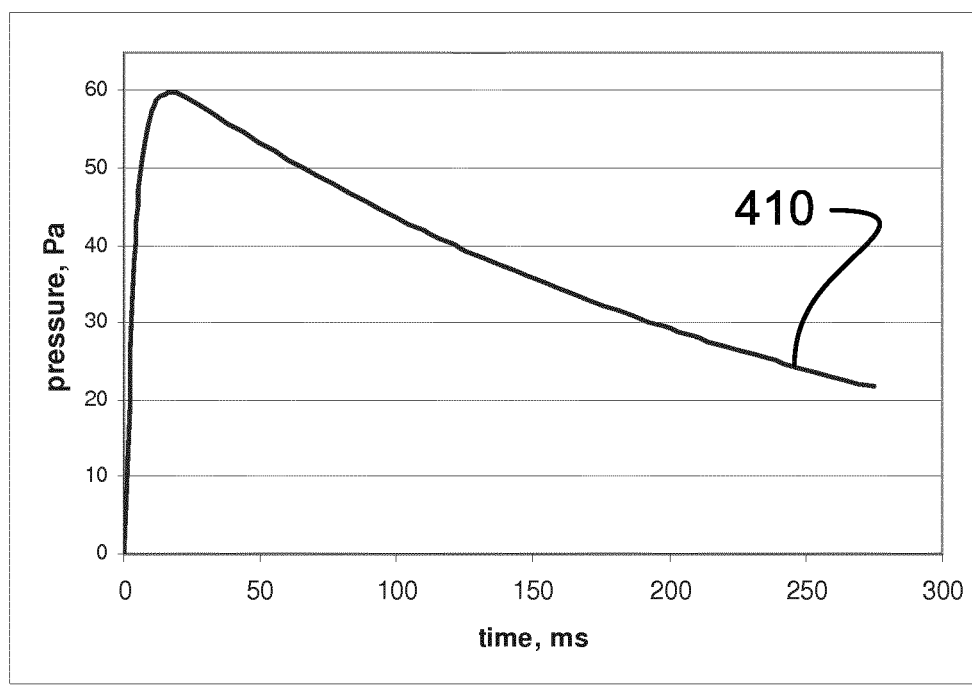
FIGS. 4A-B illustrate example simulation waveforms of overpressure responses.
Figure 4B:
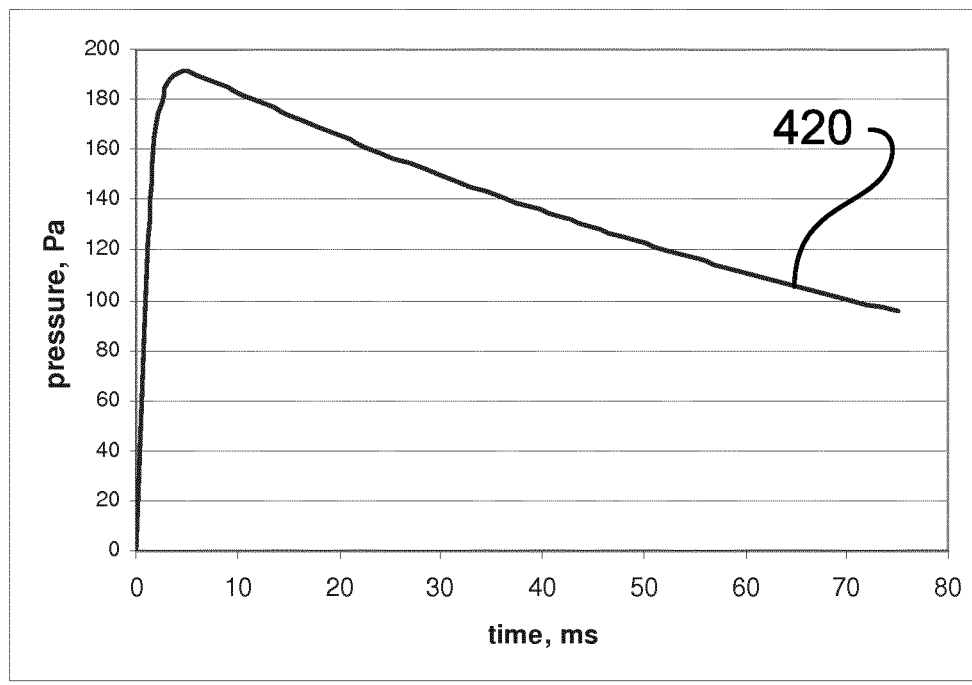

With reference to FIGS. 4A-B, a response of the thermal gas property sensor 100 is shown based on a particular numerical example. It should be noted that the values given herein are merely one example, and that other values are also possible. Thus, in this example, the pressure generator 130 is a 100 Ohm heating resistor surface-mounted on the substrate 210 to which is applied a 2.5 V heating voltage. The resistor has a mass of $1.5*10^{-4}$ g, a heat capacity of $1.5*10^{-4}$ J/K, a heating time constant of 0.25 s, and an estimated overheating temperature of 100° C. The resistor is located in the cavity 120, which has a volume of 0.04 ml, and the gas in the cavity 120 is estimated to have an average temperature of 10° C. FIG. 4A presents a pressure waveform 410 simulated from Equation 10 for parameters of the heating resistor given above and pneumatic resistance of 50000 Pa*s/ml for the thermal flow sensor 110.

If the pressure generator 130 used is a heating resistor with a lower thermal mass enclosed in smaller volume, the thermal gas property sensor 100 provides a faster response. FIG. 4B shows a simulated response 420 for the thermal gas property sensor 100 where the pressure generator 130 is a 100 Ohm resistor having a mass of $0.5*10^{-4}$ g, a heating time constant of 0.1 s, and where the cavity 120 has a volume of 0.002 ml (e.g. 2×2×0.5 mm³).

Figure 5:
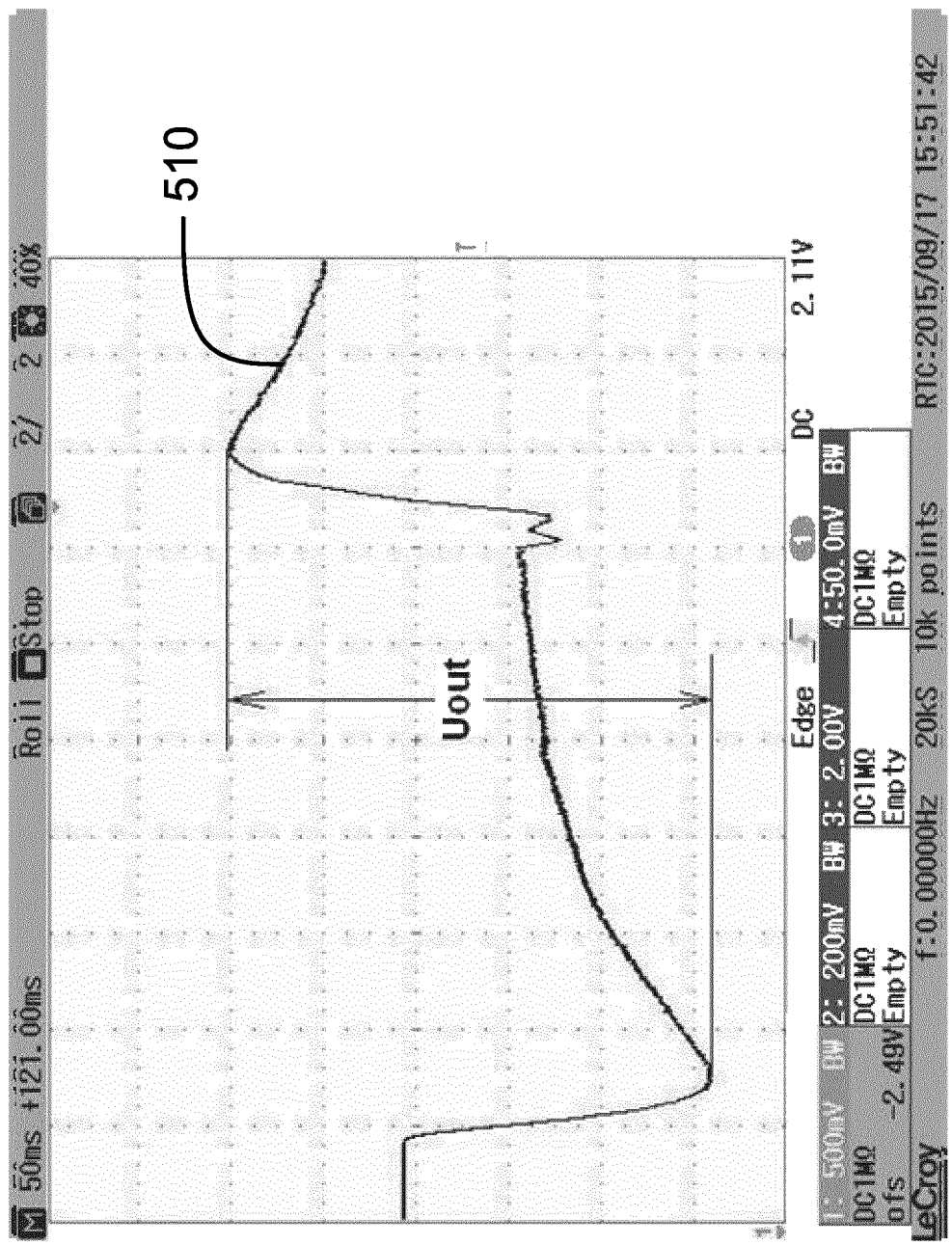
FIG. 5 illustrates an example measured variation in output of a gas property sensor.

With reference to FIG. 5, there is shown an experimentally measured output voltage waveform 510 of the thermal gas property sensor 100 during heating and cooling cycles of the heating resistor 130. The results of FIG. 5 are obtained for the experimental prototype with parameters similar to those used in the numerical example of FIG. 4A. A net output $U_{out}$ of the thermal gas property sensor 100 is processed as a difference between a minimum and a maximum output voltage.

Figure 6:
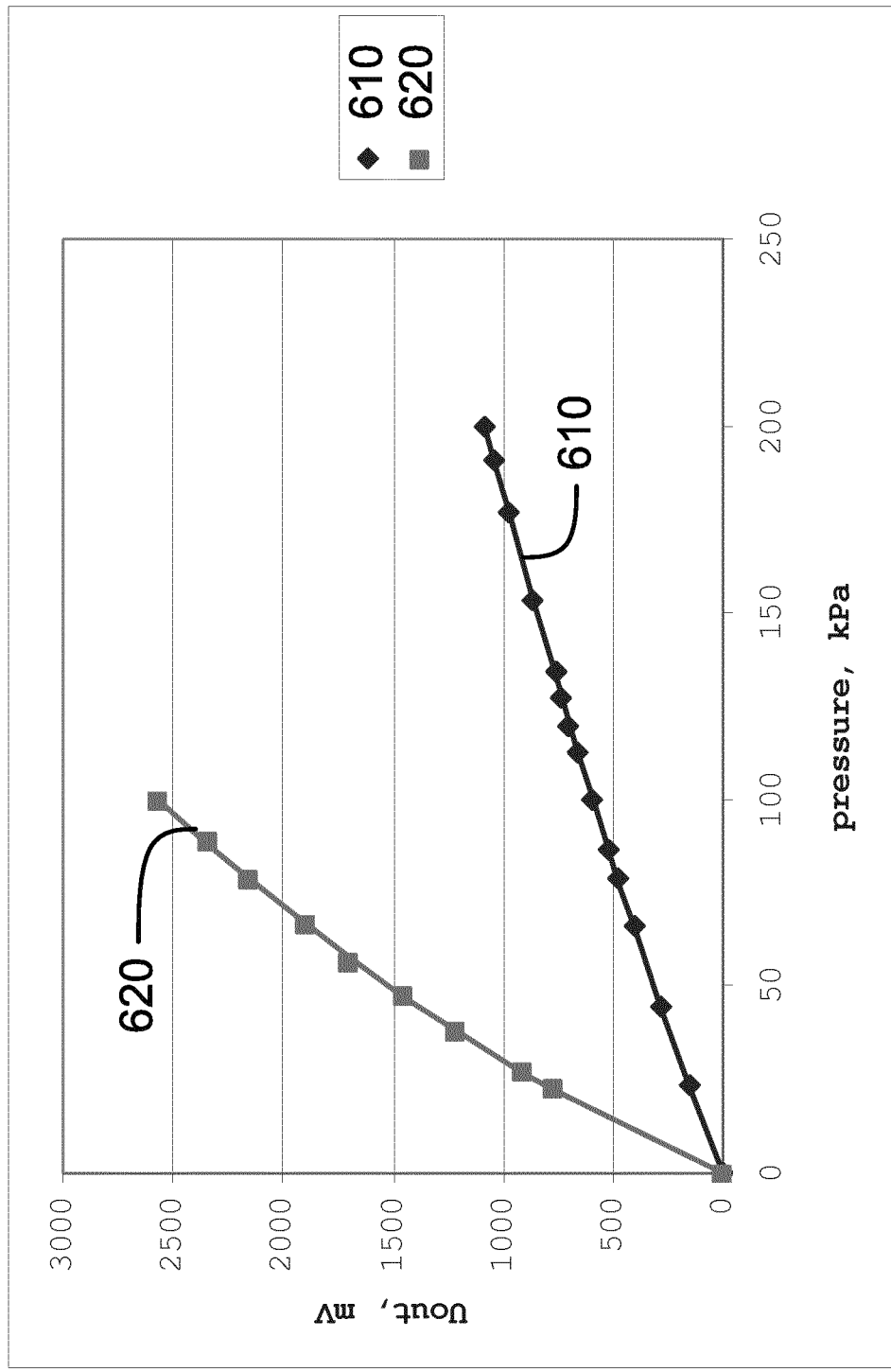
FIG. 6 illustrates an example output of a gas property sensor in response to different gases.

With reference to FIG. 6, an experimental prototype of the thermal gas property sensor 100 was tested with two different gases—air and butane ($C_4H_{10}$). FIG. 6 shows responses of the thermal gas property sensor 100 measured at different ambient pressures. Namely, curve 610 is the response of the thermal gas property sensor 100 to air, and curve 620 is the response of the thermal gas property sensor 100 to butane.

In certain embodiments, if the gas composition is known and remains constant during operation, the thermal gas property sensor 100 can be used to measure an ambient pressure. In this case the thermal gas property sensor 100 can be combined with a Pirani type thermal sensor sensitive to gas thermal conductivity which measures low absolute pressure (below $10^{-3}$ bar). A combination of these two sensors can be used to measure absolute pressure over a very wide range—from low vacuum to tens of bar. Practically, these two sensors can be integrated as part of one semiconductor device 150 and can use unified or shared internal micro-heaters and temperature-sensitive elements, for example thermopiles or thermoresistors.

Figure 7:
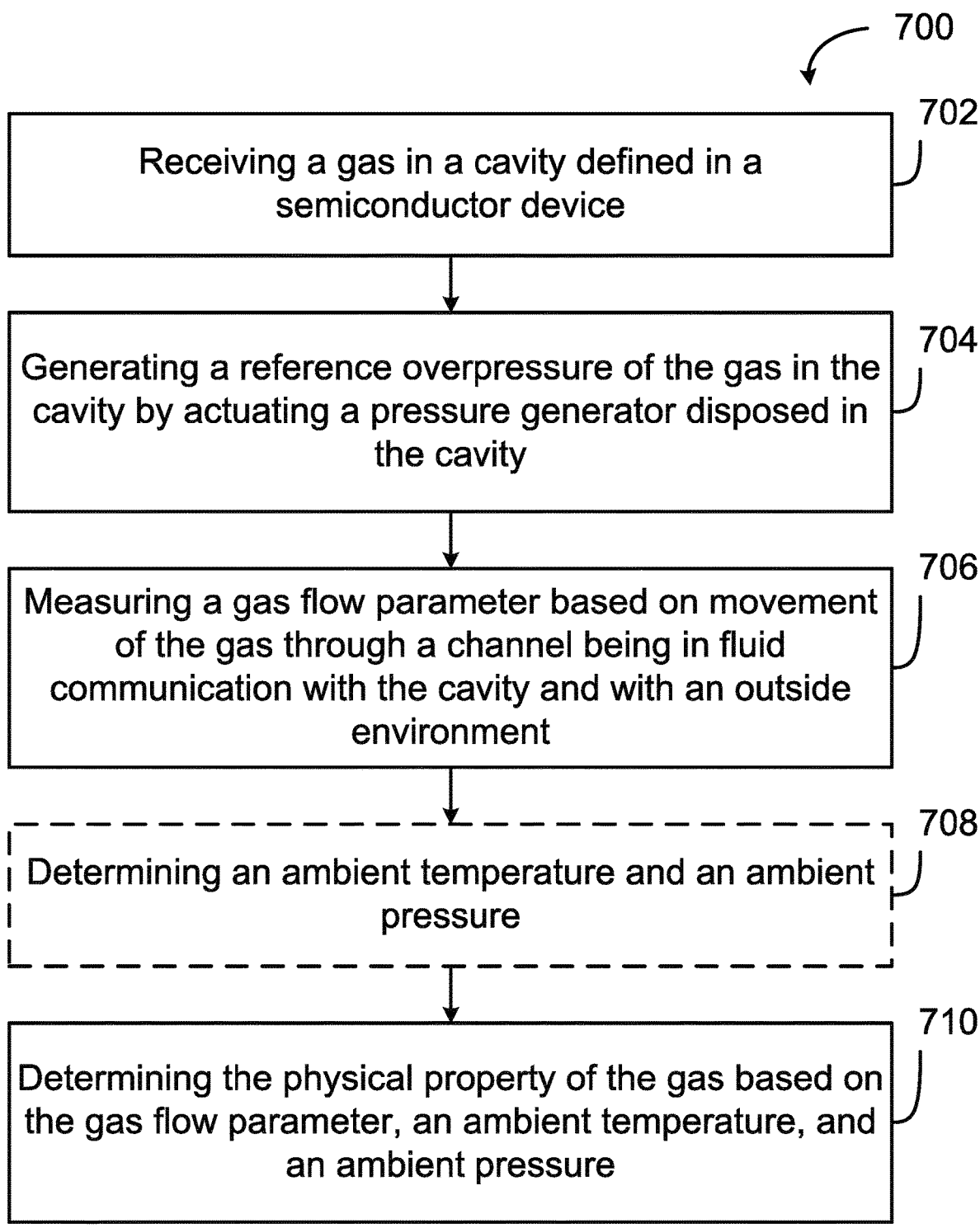
FIG. 7 is a flowchart illustrating a method for measuring a physical property of a gas according to an embodiment.

With reference to FIG. 7, the thermal gas property sensor 100 can be used to implement a method 700 for measuring a physical property of a gas. At step 702, the gas is received in the cavity 120. At step 704, the reference overpressure of the gas is generated in the cavity 120, for example by actuating the pressure generator 130. As discussed hereinabove, the pressure generator 130 can be actuated in any suitable pattern or mode of operation. At step 706, a gas flow parameter is measured based on gas flow through a channel in fluid communication with the cavity 120 and an outside environment, for example the flow channel 112. The gas flow parameter can be measured, for example, by the flow-sensitive elements 114. In some embodiments, a calorimetric-type thermal flow sensor can be used to measure the gas flow parameter. Optionally, at step 708, an ambient pressure and an ambient temperature are determined, for example by a secondary sensor (not illustrated). Alternatively, the ambient pressure and ambient temperature may already be known. At step 710, the physical property of the gas is determined based on the gas flow parameter, the ambient temperature, and the ambient pressure.

The gas property determination capability of the thermal gas property sensor 100 can be used in other applications. For example, as discussed hereinabove, calorimetric-type sensors or their equivalents can be used as differential pressure sensors. However, the response of such differential pressure sensors can be adversely affected by ambient pressure $P_0$ and gas composition. By pneumatically connecting the thermal gas property sensor 100 to the differential pressure sensor and measuring a gas-specific function, the output of the thermal gas property sensor 100 can be used to compensate the pressure response of the differential pressure sensor.

Figure 8:
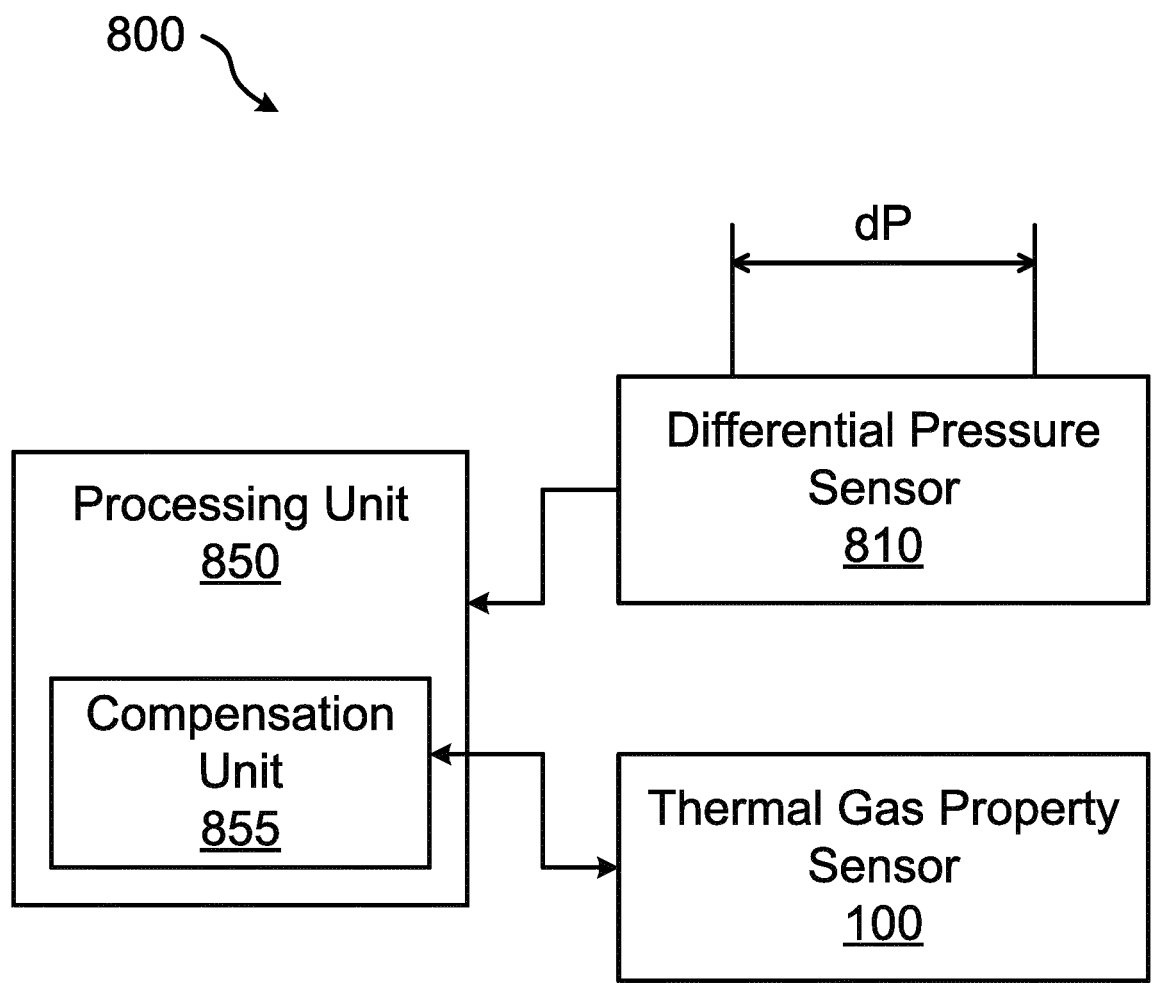
FIG. 8 is a schematic diagram of an example differential pressure sensor combined with the gas property sensor of FIG. 1.

Thus, with reference to FIG. 8, a compensated differential pressure sensor 800 is shown as comprising the thermal gas property sensor 100 and a differential pressure sensor 810. Both the thermal gas property sensor 100 and the differential pressure sensor 810 are communicatively coupled to a processing unit 850, which includes a compensation unit 855. The thermal gas property sensor 100 can be any embodiment of the thermal gas property sensor 100 discussed herein, and is configured for providing information regarding one or more physical properties of a gas to the processing unit 850, and more specifically to the compensation unit 855.

The differential pressure sensor 810 can be implemented via a calorimetric-type sensor operating in a certain gas media. The differential pressure sensor 810 is thus configured for measuring the differential pressure dP associated with a gas in an environment and for providing an indication of the measurement to the processing unit 850. The indication can be provided to the processing unit 850 in any suitable format using any suitable data type. In addition, the indication can be provided to the processing unit 850 at any suitable moment in time, for example periodically, or in response to one or more triggers.

The processing unit 850 can be any computer or processor capable of receiving input from sensors and processing the input. The processing unit 850 is configured to receive input from the thermal gas property sensor 100 and the differential pressure sensor 810. The processing unit 850 includes a compensation unit 855 which is configured to receive an input from the thermal gas property sensor 100 indicative of one or more physical properties of the gas. The processing unit 850, and more specifically the compensation unit 855, can use the input from the thermal gas property sensor 100 to compensate measurements received from the differential pressure sensor 810. The input from the thermal gas property sensor can be received periodically, or can be requested by the processing unit 850.

Thus, for example, the processing unit 850 can receive a differential pressure measurement from the differential pressure sensor 810 and can either request an input from the thermal gas property sensor 100, or may retrieve a previously-received input from the thermal gas property sensor 100. The processing unit 850 can then use the input from the thermal gas property sensor 100, which is indicative of one or more physical properties of the gas, to compensate the differential pressure measurement from the differential pressure sensor 810. Other embodiments are also considered.

Figure 9:
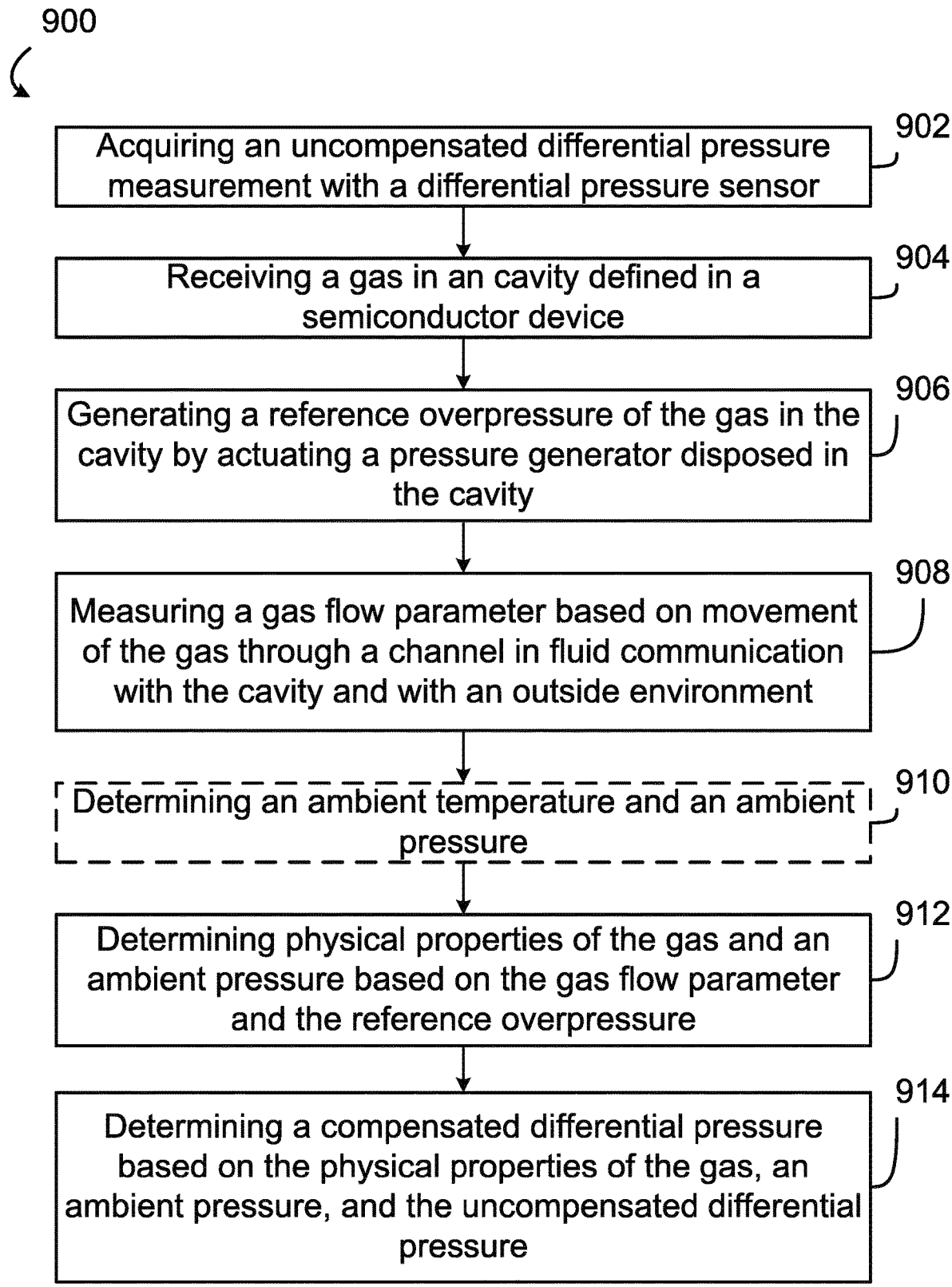
FIG. 9 is a flowchart illustrating a method for compensating a differential pressure measurement according to an embodiment.

With reference to FIG. 9, the compensated differential pressure sensor 800 can be used to implement a method 900 for compensating a differential pressure measurement. At step 902, an uncompensated differential pressure measurement is acquired, for example from the calorimetric-type pressure sensor, via a first thermal flow-sensitive element, such as the flow-sensitive elements 114. At step 904, the gas is received in a cavity defined in a semiconductor device, for example the cavity 120. At step 906, a reference overpressure of the gas is generated in the cavity 120 by actuating a pressure generator disposed in the cavity 120, for example the pressure generator 130. At step 908, a gas flow parameter is measured based on movement of the gas through a channel, for example the flow channel 112, which is connected to the cavity 120 and to an outside environment.

Optionally, at step 910, an ambient temperature and an ambient pressure are determined, for example by a secondary sensor (not illustrated). Alternatively, the ambient pressure and ambient temperature may already be known. At step 912, a physical property of the gas is determined based on the gas flow parameter, the ambient temperature, and the ambient pressure. At step 914, a compensated differential pressure is determined based on the physical property of the gas determined at step 912, the ambient pressure, and the uncompensated differential pressure.

In certain embodiments, similar semiconductor technologies are used for the calorimetric-type sensor in the differential pressure unit 810 and the thermal gas property sensor 100. Thus, any flow-sensing elements, micro heaters, and the like, used in the calorimetric-type sensor are similar or substantially identical to the flow-sensing elements 114 used in the thermal gas property sensor 100.

In some embodiments, the thermal gas property sensor 100 used to perform gas composition identification and/or absolute pressure measurement can be based on a calorimetric-type thermal flow sensor. If the calorimetric-type thermal flow sensor is connected to a pressure generator or other component suitable for generation of a predetermined reference overpressure, the output of the calorimetric-type thermal flow sensor can be used for identification of gas physical properties.

In certain embodiments, the thermal gas property sensor 100 can further include an additional absolute pressure sensor (not illustrated) which is insensitive to gas properties in order to compensate for any influence of ambient pressure on the response of the flow-sensitive elements 114. In other embodiments, the thermal gas property sensor can further include sensors which measure other gas parameters like the thermal conductivity and/or the speed of sound in a gas in order to further refine the determination of the properties of the gas and gas composition in the cavity 120, especially when the gas in the cavity 120 is a mixture of various gas species.

Figure 10:
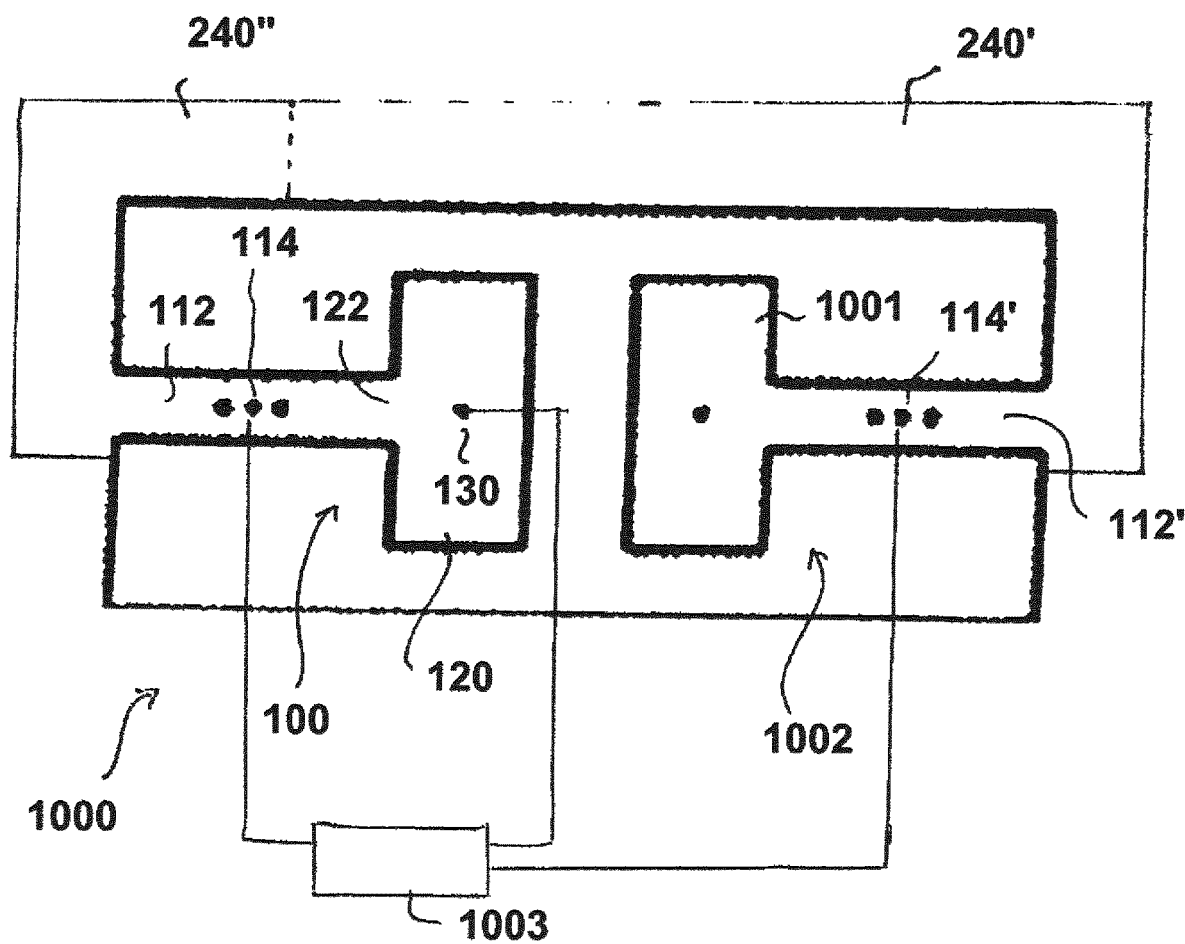
FIG. 10 shows a schematic view of a compensated gas pressure sensor including a gas property sensor.
Figure 11:
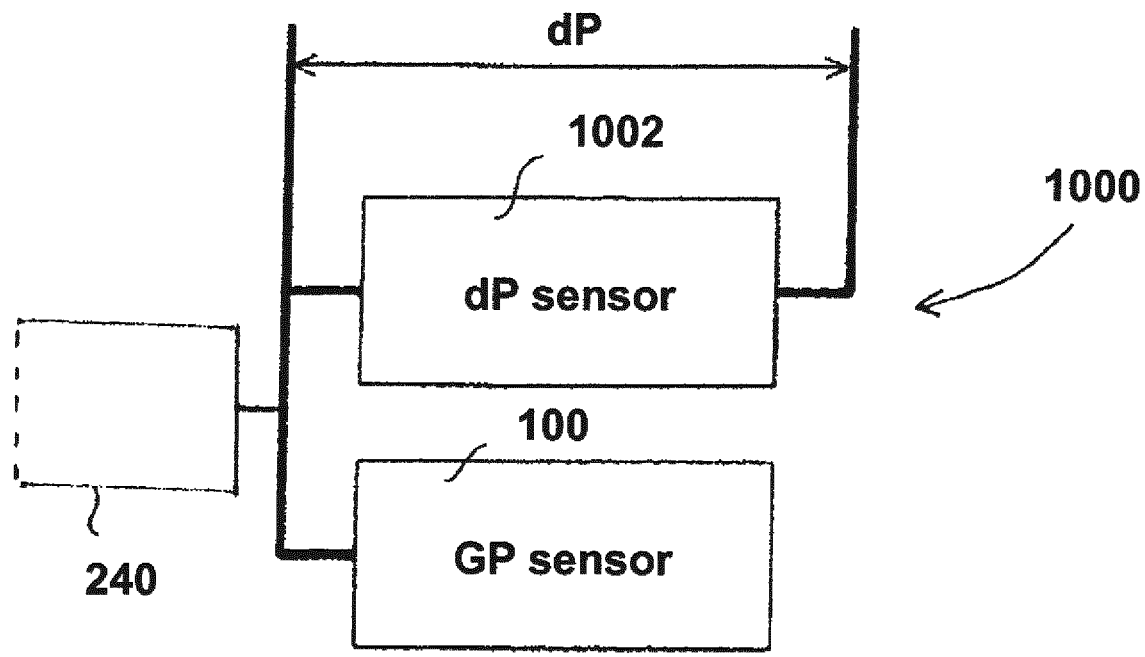
FIG. 11 shows a simplified schematic view of the sensor of FIG. 10.

FIG. 10 shows a compensated differential gas pressure sensor 1000 with a gas property sensor 100, which has been described above. The gas property sensor 100 measures a gas flow in a channel 112 that is connected to a cavity 120 and a first gas volume 240, which may be a closed volume or the ambient environment. The first gas volume 240 may also be connected to the ambient environment and/or to a second gas volume 240 of an uncompensated differential gas pressure sensor 1002. For example, both the gas property sensor 100 and the uncompensated differential gas pressure sensor 1002 may be connected to the same first gas volume 240. In FIGS. 10 and 11, the dotted lines limiting gas volumes 240, 240' indicate that there may or may not be a gas connection between the two gas volumes or between the first gas volume and the ambient environment. The differential gas pressure sensor 1002 has a first chamber 1001, which is connected to the first gas volume 240, 240' by a channel 120'. Gas flow sensors 114' are located in the channel 112'.

At least the gas flow sensors 114 of the gas property sensor 100, the gas flow sensors 114' of the uncompensated differential gas pressure sensor 1002, and the pressure generator 130 of the gas property sensor 100 are electrically connected to the processing unit 1003, which generates a compensated value of the gas pressure difference between the first chamber 1001 and the first gas volume 240. Further, one or more absolute gas pressure sensors and one or more gas temperature sensors, which may be located in the cavity 120, the first chamber 1001, or the first gas volume 240 may be connected to the processing unit 1003.

FIG. 11 shows a less detailed view of the compensated differential gas pressure sensor of FIG. 10 without the electric connections.

Figure 12:
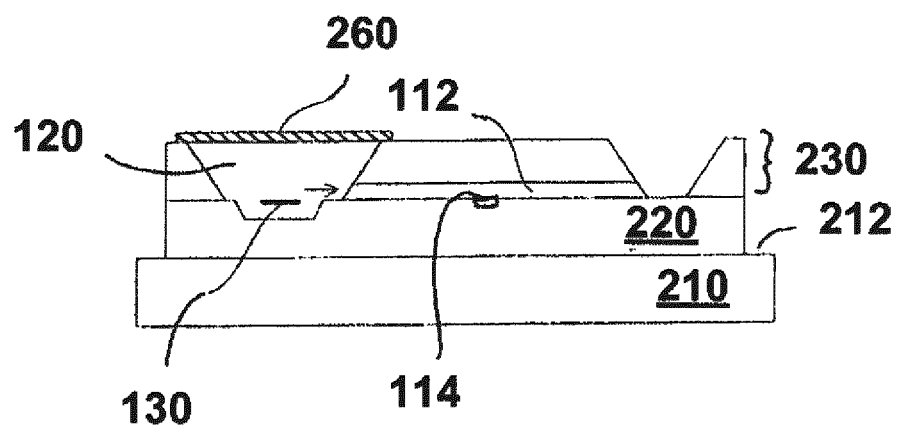
FIG. 12 shows a particular implementation of a sensor as a semiconductor device.

According to FIG. 12, a heating element 130 is placed on the first semiconductor chip portion 220, which is placed on the substrate 210. The heating element may be integrated into the first semiconductor chip portion as well as flow-sensing elements 114. A second semiconductor chip portion 230 is bonded/fixed on top of the first semiconductor chip 220. A groove is etched into the second semiconductor chip portion by shallow etching to a depth of 50-60 μm in order to form the channel 112 between the chip portions. Further, at least a part of the cavity 120 is formed in the second semiconductor chip portion 230. In order to create a sufficient volume of the cavity 120, the chip portion 230 may be etched from both sides to a form a through-hole (by through-hole etching) that is covered by the lid or cap 260 and sealed, e.g. by an adhesive. Both the heating element and the flow sensor(s) may be electrically connected to the first chip portion solely in order to avoid the necessity to bond/connect them to more than one chip portion.

Various aspects of the thermal gas property sensor disclosed herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

The following aspects or individual features of them may form part of the invention. Each of the aspects or elements thereof may further be combined with current or later patent claims in order to reflect an implementation of the invention.

Aspect 1:
A gas property sensor, comprising:
a semiconductor device having defined therein:
  a cavity having an opening; and
  a channel in fluid communication with the cavity via the opening and with an outside environment;
a pressure generator disposed in the cavity; and
a plurality of flow-sensitive elements located in the channel for determining a gas flow parameter.

Aspect 2:
The sensor of aspect 1, wherein the semiconductor device comprises:
a substrate having first and second surfaces;
a first semiconductor chip portion mounted on the first surface of the substrate, the cavity being defined within the first semiconductor chip portion; and
a second semiconductor chip portion mounted on the first semiconductor chip portion, the channel being defined within at least one of the first and the second semiconductor chip portion.

Aspect 3:
The sensor of aspect 2, wherein the cavity is further defined within the substrate.

Aspect 4:
The sensor of aspect 2 or 3, wherein the pressure generator is a heating element.

Aspect 5:
The sensor of aspect 4, wherein the heating element is mounted on the first surface of the substrate.

Aspect 6:
The sensor of aspect 4, wherein the heating element is embedded within the first surface of the substrate.

Aspect 7:
The sensor of any of aspects 1 to 3, further comprising a processing unit configured to determine at least one physical property of the gas based on a gas flow parameter.

Aspect 8:
The sensor of aspect 7, wherein the processing unit is configured to identify a chemical composition of the gas.

Aspect 9:
The sensor of any of aspects 1 to 8, wherein determining a gas flow parameter comprises:
measuring a first gas flow rate following an increase of reference gas pressure inside the cavity;

measuring a second gas flow rate following a decrease of reference gas pressure inside the cavity; and determining the gas flow parameter based on a difference between the first and second gas flow rates.

Aspect 10:

The sensor of any of aspects 1 to 9, wherein the plurality of flow-sensitive elements comprise at least a first temperature sensor located at a first position in the channel and a second temperature sensor located at a second position in the channel different from the first position.

Aspect 11:

A method for measuring a physical property of a gas, comprising:

receiving the gas in a cavity defined in a semiconductor device, the cavity having an opening;

generating a reference overpressure of the gas in the cavity by actuating a pressure generator disposed in the cavity;

measuring a gas flow parameter based on movement of the gas through a channel in fluid communication with the cavity via the opening and with an outside environment; and determining the physical property of the gas based on the gas flow parameter, an ambient temperature, and an ambient pressure.

Aspect 12:

A compensated differential pressure sensor, comprising:

a gas property sensor, comprising:
 a semiconductor device having defined therein:
  a cavity having an opening; and
  a channel in fluid communication with the cavity via the opening and with an outside environment;
 a pressure generator disposed in the cavity; and
 a plurality of flow-sensitive elements located in the channel for determining a gas flow parameter;

a differential pressure sensor pneumatically coupled to a same gas media as the gas property sensor and configured for acquiring an uncompensated differential pressure measurement; and a processing unit configured for providing a compensated differential pressure based on at least one of physical properties of the gas and an ambient pressure and the uncompensated differential pressure.

Aspect 13:

A method for compensating a differential pressure measurement, comprising:

acquiring an uncompensated differential pressure measurement with a differential pressure sensor;

receiving a gas in a cavity defined in a semiconductor chip located on a first surface of a substrate, the cavity having an opening;

generating a reference overpressure of the gas in the cavity by actuating a pressure generator disposed in the cavity;

measuring a gas flow parameter based on movement of the gas through a channel in fluid communication with the cavity via the opening and with an outside environment;

determining physical properties of the gas and an ambient pressure based on the gas flow parameter and the reference overpressure; and determining a compensated differential pressure based on the physical properties of the gas, an ambient pressure, and the uncompensated differential pressure.

Aspect 14:

A method for measuring physical properties of a first gas, that is enclosed in a first cavity, which is connected by a first channel with a first gas volume, wherein in one possible implementation the first gas volume can be an ambient environment, said method including the steps of:

determining a gas pressure difference or generating a gas pressure difference between the cavity and the first gas volume, measuring in the first channel a gas flow that is directed from the cavity to the first gas volume, wherein the gas flow is being measured by a thermal flow-sensing element, determining a first parameter as a function of the gas pressure difference and a second parameter representing the measured gas flow.

Aspect 15:

The method according to aspect 14, wherein the first parameter contains the ratio of a second parameter representing the measured gas flow and the gas pressure difference.

Aspect 16:

The method according to aspect 14 or 15, wherein a pressure difference between the first chamber and the first gas volume is generated by generating a reference overpressure in the cavity.

Aspect 17:

The method according to aspect 16, wherein the pressure difference between the cavity and the first gas volume is generated by heating the first gas in the cavity.

Aspect 18:

The method according to aspect 17, wherein the gas flow is measured after the establishment of stationary thermal conditions including a stable temperature gradient in the cavity.

Aspect 19:

The method according to one of the aspects 14 to 19, wherein additionally one or more of the following parameters is being measured: ambient temperature, absolute pressure of the first gas in the cavity and/or of a second gas in the first gas volume, gas viscosity of the first gas, thermal conductivity of the first gas, thermal capacity of the first gas.

Aspect 20:

The method according to one of the aspects 14 to 19, wherein the first gas is identified on the basis of the ratio of a second parameter representing the measured gas flow and the gas pressure difference.

Aspect 21:

The method according to aspect 20, wherein the first gas is identified on the basis of the ratio of a second parameter representing the measured gas flow and the gas pressure difference and the measurement or determination of one or more of the following parameters: ambient temperature, absolute pressure of the first gas in the cavity and/or of a second gas in the first gas volume, gas viscosity of the first gas, thermal conductivity of the first gas, thermal capacity of the first gas.

Aspect 22:

The method according to one of aspects 14 to 21, wherein the heating of the first gas is stopped and the gas flow is measured again while the temperature of the first gas in the cavity is decreasing.

Aspect 23:

A method for measuring a differential pressure between a first chamber, which is filled with a first gas, and the first gas volume or a second gas volume or an ambient environment, that is connected to said first chamber by a measuring channel, wherein a gas flow of the first gas is being measured in the measuring channel between the first chamber and the first or second gas volume or ambient environment by a thermal flow sensor, and wherein gas properties of the first gas are determined by:

using a cavity that is filled with the first gas and that is connected by a first channel with a first gas volume of known gas pressure, generating a reference overpressure in the cavity and/or determining a gas pressure difference between the cavity and the first gas volume, measuring in the first channel a gas flow of the first gas that is directed from the cavity to the first or second gas volume or the ambient environment, wherein the gas flow is being measured by a thermal flow-sensing element, determining a first parameter as a function of the gas pressure difference and a second parameter representing the measured gas flow, determining physical properties of the first gas or identifying the first gas, on the basis of the first parameter.

Aspect 24:

A method for measuring a gas density of a first gas in a cavity, that is connected to a first gas volume by a first channel, wherein the method comprises the following steps:

determining physical gas properties, at least the thermal capacity and the thermal conductivity of the first gas and/or identifying the first gas by applying the method according one of the aspects 14 to 22, and determining the gas density in the cavity on the basis of the gas flow that has been measured at stable thermal conditions in the cavity and the thermal conductivity of the first gas as well as the thermal capacity of the first gas and the thermal conductivity of the first gas.

Aspect 25:

The method according to aspect 24, wherein the absolute pressure of the first gas is being measured in the cavity and the specific density of the first gas is determined.

Aspect 26:

An apparatus for measuring gas properties of a first gas, comprising:

a cavity and a first gas channel connecting the cavity with a first gas volume, a thermal flow-sensing element that is located in the first gas channel and a heating element for heating said first gas in said cavity, wherein the heating element is located in or near said cavity, a control unit that is connected to the heating element and a data processing unit determining a first parameter as a function of the gas pressure difference and a second parameter representing the measured gas flow wherein the data processing unit is connected to the thermal flow-sensing element.

Aspect 27:

The apparatus according to aspect 26 comprising a sensor for measuring a gas temperature and/or a gas pressure wherein at least one of the sensors is located in the cavity.

Aspect 28:

An apparatus for measuring a differential pressure between a first chamber, which is filled with a first gas, and a first or second gas volume or an ambient environment, that is connected to said first chamber by a measuring channel, with a thermal gas flow sensor that is located in the measuring channel between the first chamber and the first or second gas volume or an ambient environment, a cavity that is filled with the first gas and that is connected by a first channel with the first gas volume or an ambient environment, a heating element in the cavity for generating a reference overpressure in the cavity, a thermal gas flow sensor that is located in the first channel between the cavity and the first gas volume or an ambient environment, and a data processing unit for determining physical properties of the first gas or identifying the first gas on the basis of a first parameter, which is a function of the reference overpressure in the cavity and a second parameter representing the measured gas flow in the first channel, and for determining the differential pressure on the basis of the gas flow that is measured in the measuring channel and the gas properties of the first gas.

Aspect 29:

The apparatus for measuring gas properties of a first gas according to aspect 1, 2, or 26, wherein the cavity and/or a channel is formed between a first semiconductor portion and a second semiconductor portion and wherein the cavity is formed by at least a recess in the first or second semiconductor portion or corresponding recesses in both semiconductor portions.

Aspect 30:

The apparatus according to one of the aspects 1, 2, 26, or 29, wherein at least one channel that is connected to the cavity is formed by a recess or groove in one or both of a first and a second semiconductor portion, wherein the two semiconductor portions are bonded together.

Aspect 31:

The apparatus according to one of the aspects 1, 2, 26, 29, or 30, wherein one of the semiconductor portions has a recess that is formed by a through-hole that is covered by a lid or cap that is fixed to the semiconductor portion.

Aspect 32:

A method for measuring physical properties of a first fluid that is enclosed in a first chamber, which is connected by a first channel with a first volume, said method including the steps of:

determining a fluid pressure difference or generating a fluid pressure difference between the first chamber and the first volume, measuring in the first channel a fluid flow that is directed from the first chamber to the first volume, wherein the fluid flow is measured by a thermal flow-sensing element, determining a first parameter as a function of the fluid pressure difference and a second parameter representing the measured fluid flow.

Aspect 33:

The method according to aspect 32, wherein the first parameter contains the ratio of a second parameter representing the measured fluid flow and the fluid pressure difference.

Aspect 34:

The method according to aspect 32 or 33, wherein a pressure difference between the first chamber and the first volume is generated by generating a reference overpressure in the first chamber.

Aspect 35:

The method according to aspect 34, wherein the pressure difference between the first chamber and the first volume is generated by heating the fluid in the first chamber or by expanding an expansion element in the first chamber.

Aspect 36:

The method according to one of aspects 32 to 35, wherein the fluid is a liquid.

Aspect 37:

The method according to one of aspects 32 to 36, wherein additionally one or more of the following parameters is measured: ambient temperature, absolute pressure of the first fluid in the first chamber and/or of a second fluid in the first volume, viscosity of the first fluid, thermal conductivity of the first fluid, thermal capacity of the first fluid.

Aspect 38:
The method according to one of aspects 32 to 37, wherein the fluid is identified on the basis of the ratio of a second parameter representing the measured fluid flow and the fluid pressure difference.

Aspect 39:
The method according to aspect 38, wherein the first fluid is identified on the basis of the ratio of a second parameter representing the measured fluid flow and the fluid pressure difference and the measurement or determination of one or more of the following parameters: ambient temperature, absolute pressure of the fluid in the first chamber and/or of a second fluid in the first volume, viscosity of the fluid, thermal conductivity of the fluid, thermal capacity of the fluid.

Aspect 40:
A method for measuring a differential pressure between a measuring chamber, which is filled with a first fluid, and a measuring volume that is connected to said measuring chamber by a measuring channel, wherein
a fluid flow of a first fluid is measured in the measuring channel between the measuring chamber and the measuring volume by a thermal flow sensor, and wherein
fluid properties of the first fluid are determined by:
using a first chamber that is filled with the first fluid and that is connected by a first channel with a first volume of known fluid pressure,
generating a reference overpressure in the first chamber and/or determining a fluid pressure difference between the first chamber and the first volume,
measuring in the first channel a fluid flow of the first fluid that is directed from the first chamber to the first volume, wherein the fluid flow is measured by a thermal flow-sensing element,
determining a first parameter as a function of the fluid pressure difference and a second parameter representing the measured fluid flow,
determining physical properties of the first fluid or identifying the first fluid on the basis of the first parameter.

Aspect 41:
The method according to aspect 40, wherein the first fluid is a liquid.

Aspect 42:
An apparatus for measuring properties of a first fluid, comprising:
a first chamber and a first channel connecting the first chamber with the first volume,
a thermal flow-sensing element that is located in the first channel, and
a heating element for heating said first fluid in said first chamber, wherein the heating element is located in or near said first chamber, or an expansion element that may be controlled to expand its volume and is located in the first chamber, wherein the expansion element comprises a gas filled volume and wherein the pressure that is transferred from the expansion element to the fluid may be controlled,
a control unit that is connected to the heating element or to the expansion element, and
a data processing unit determining a first parameter as a function of the fluid pressure difference and a second parameter representing the measured fluid flow, wherein the data processing unit is connected to the thermal flow-sensing element.

Aspect 43:
The apparatus according to aspect 42, comprising a sensor for measuring a fluid temperature and/or a fluid pressure, wherein the sensor is located in the first chamber.

Aspect 44:
An apparatus for measuring a differential pressure between a measuring chamber, which is filled with a first fluid, and a measuring volume that is connected to said measuring chamber by a measuring channel, with
a thermal fluid flow sensor that is located in the measuring channel between the measuring chamber and the measuring volume,
a first chamber that is filled with the first fluid and that is connected by a first channel with a first volume,
an overpressure element or an expansion element in the first chamber for generating a reference overpressure in the first chamber,
a thermal fluid flow sensor hat is located in the first channel between the first chamber and the first volume, and
a data processing unit for determining physical properties of the first fluid or identifying the fluid on the basis of a first parameter, which is a function of the reference overpressure in the first chamber, and a second parameter representing the measured fluid flow in the first channel, and for determining the differential pressure on the basis of the fluid flow that is measured in the measuring channel and the fluid properties of the fluid.

The invention claimed is:
1. A gas property sensor, comprising:
a semiconductor measuring device, the measuring device comprising:
a cavity that carries a first gas and has at least one opening; and
at least one channel in fluid communication with the cavity via an opening and with a first gas volume;
a pressure generator disposed in the cavity; and
one or more flow-sensitive elements located in the channel for determining a gas flow parameter, wherein the measuring device further comprises:
a substrate having first and second surfaces;
a first semiconductor chip portion mounted on the first surface of the substrate; and
a second semiconductor chip portion mounted on the first semiconductor chip portion, the channel being defined within at least one of the first or the second semiconductor chip portion, wherein the cavity defines a partially enclosed space in the semiconductor measuring device, wherein the cavity is open only to the channel via the opening.

2. The sensor of claim 1, wherein at least a part of the cavity is further defined within the substrate.

3. The sensor of claim 1, wherein the pressure generator is a heating element.

4. The sensor of claim 3, wherein the heating element is mounted on the first surface of the substrate and/or embedded within the first surface of the substrate.

5. The sensor of claim 1, further comprising:
a processing unit, wherein the processing unit is configured to determine at least one physical property of the first gas based on at least one of: a gas flow parameter, or a thermal flow parameter or the gas pressure difference, or wherein the processing unit is configured to identify a chemical composition of the first gas.

6. The sensor of claim 1, wherein determining a gas flow parameter comprises:
measuring a first gas flow rate following an increase of reference gas pressure inside the cavity;
measuring a second gas flow rate following a decrease of reference gas pressure inside the cavity; and determining the gas flow parameter based on a difference between the first and second gas flow rates and/or estimating gas properties by analyzing a curvature of a signal of said flow sensor.

7. The sensor of claim 1, wherein the one or more flow-sensitive elements comprise at least a first temperature sensor located at a first position in the channel and a second temperature sensor located at a second position in the channel different from the first position.

8. The sensor of claim 1, wherein the one or more flow-sensitive elements comprise:
at least one heating element that is configured to heat a heat exchange element with a predetermined energy rate; and
a temperature sensor sensing a temperature of the heat exchange element, wherein the heat exchange element is exposed to the gas flow in the channel.

9. The sensor of claim 1, comprising at least one of: a sensor for measuring a gas temperature or a sensor for measuring a gas pressure.

10. The gas property sensor of claim 1, included in a compensated differential gas pressure sensor, comprising:
a differential pressure sensor pneumatically coupled to a first chamber that contains the same gas contained in the gas property sensor cavity and configured for measuring an uncompensated differential pressure between the first chamber and the first or a second gas volume or an ambient environment; and
a processing unit configured for providing a compensated differential pressure based on the at least one of physical properties of the gas and a pressure in the first or second gas volume and the uncompensated differential pressure.

11. The gas property sensor of claim 10, wherein the differential pressure sensor is configured for measuring an uncompensated differential pressure and comprises a thermal gas flow sensor that is located in a measuring channel that is pneumatically coupled to the first chamber as well as to the first gas volume or a second gas volume.

12. The gas property sensor of claim 10, wherein the processing unit is configured to determine a quantity of the gas that has flowed through a channel in a predetermined time interval and to determine an equivalent of the gas quantity, particularly a price.

13. The gas property sensor of claim 10, included in a system with a gas tube connecting a gas reservoir with at least one gas consuming device, and wherein the system provides an indication of a quantity of the gas that has been consumed in a time interval based on a measured compensated pressure difference.

14. A method for measuring a physical property of a gas making use of a gas property sensor comprising a semiconductor measuring device, the measuring device including:
a cavity that carries a first gas and has at least one opening;
at least one channel in fluid communication with the cavity via an opening and with a first gas volume, wherein the channel is defined within at least one of a first semiconductor chip portion mounted on a first surface of a substrate or a second semiconductor chip portion mounted on the first semiconductor chip portion;
a pressure difference sensor measuring the pressure difference between the cavity and the first gas volume, and/or a pressure generator disposed in the cavity; and
one or more flow-sensitive elements located in the channel for determining a gas flow parameter, the method comprising:
receiving the gas in the cavity of the measuring device, the cavity having at least one opening;
measuring an overpressure in a first case where the gas property sensor comprises a pressure difference sensor, or generating a reference overpressure of the gas in the cavity by actuating a pressure generator disposed in or near the cavity in a second case where the gas property sensor comprises a pressure generator;
measuring a gas flow parameter based on movement of the gas through a channel in fluid communication with the cavity via the opening and with a first gas volume, wherein the first gas volume is an outside environment; and
determining the physical property of the first gas based on at least one of: the gas flow parameter, the overpressure, an ambient temperature, a temperature of the first gas in the cavity, or an ambient pressure.

15. The method according to claim 14, wherein the gas property is determined based on a ratio of the gas flow parameter representing a quantity of a gas flow and the overpressure.

16. The method according to claim 14, wherein a reference overpressure is generated by heating the gas in the cavity.

17. The method according to claim 16, wherein the gas flow is measured after establishing a stationary thermal condition in the cavity, wherein the stationary thermal condition includes a stable temperature gradient in the cavity.

18. The method according to claim 14, further comprising:
measuring at least one of: an ambient temperature, an absolute pressure of the first gas in the cavity, an absolute gas pressure in the first gas volume, a gas viscosity of the first gas, a thermal conductivity of the first gas, or a thermal capacity of the first gas.

19. The method of claim 14, in combination with a second method for measuring a compensated differential gas pressure between a first chamber and the first gas volume, a second gas volume, or an ambient environment, the second method further comprising:
measuring an uncompensated pressure difference between the first chamber that the same gas carried in the gas property sensor cavity and the first gas volume, the second gas volume, or the ambient environment, and
determining a compensated pressure difference value based on a measured physical property of the gas and a result of the uncompensated pressure difference measurement.

* * * * *